(12) United States Patent
Cachon et al.

(10) Patent No.: US 11,340,028 B2
(45) Date of Patent: May 24, 2022

(54) PLATE HEAT EXCHANGER MODULE FOR WHICH THE CHANNELS INTEGRATE AS INPUT A UNIFORM FLOW DISTRIBUTION ZONE AND A FLUID BIFURCATION ZONE

(71) Applicant: COMMISSARIAT A L'ENERGIE ATOMIQUE ET AUX ENERGIES ALTERNATIVES, Paris (FR)

(72) Inventors: Lionel Cachon, Manosque (FR); Xavier Jeanningros, Pierrevert (FR); Chiara Galati, Aix-en-Provence (FR); Alexandre Molla, Venelles (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 550 days.

(21) Appl. No.: 16/321,081

(22) PCT Filed: Aug. 2, 2017

(86) PCT No.: PCT/EP2017/069510
§ 371 (c)(1),
(2) Date: Jan. 28, 2019

(87) PCT Pub. No.: WO2018/024765
PCT Pub. Date: Feb. 8, 2018

(65) Prior Publication Data
US 2021/0285734 A1 Sep. 16, 2021

(30) Foreign Application Priority Data
Aug. 3, 2016 (FR) .................................... 1657543

(51) Int. Cl.
*F28F 9/02* (2006.01)
*F28D 9/00* (2006.01)
(Continued)

(52) U.S. Cl.
CPC .......... *F28F 9/0275* (2013.01); *F28D 9/0081* (2013.01); *F28F 3/08* (2013.01);
(Continued)

(58) Field of Classification Search
CPC .. F28D 9/0081; F28D 2021/0054; F28F 3/08; F28F 9/0275; F28F 9/026; F28F 2210/02
See application file for complete search history.

(56) References Cited

U.S. PATENT DOCUMENTS

| 4,665,975 A * | 5/1987 | Johnston ............... F28F 9/0275 |
| | | 165/167 |
| 2016/0109189 A1 * | 4/2016 | Davies .................. F28F 9/0243 |
| | | 165/173 |

(Continued)

FOREIGN PATENT DOCUMENTS

| EP | 2045544 A2 | 4/2009 |
| EP | 3009781 A1 | 4/2016 |

(Continued)

OTHER PUBLICATIONS

Corresponding International Application, Application No. PCT/EP2017/069510 Search Report, dated Oct. 20, 2017, 4 pgs.

*Primary Examiner* — Devon Russell
(74) *Attorney, Agent, or Firm* — Cooper Legal Group, LLC; Ronald M. Kachmarik (57) ABSTRACT

A heat exchanger module with a longitudinal axis including a stack of plates defining at least two fluid circuits, at least a portion of the plates each including fluid circulation channels each delimited, at least in part, by a groove. A communication is produced between the channels within a same plate and between all the plates of a same circuit, in a feed or pre-collector zone, with a succession of channel groupings, two-by-two, in the form of bifurcations.

11 Claims, 4 Drawing Sheets

(51) Int. Cl.
*F28F 3/08* (2006.01)
*F28D 21/00* (2006.01)
*G21D 1/00* (2006.01)

(52) U.S. Cl.
CPC ...... *F28F 9/026* (2013.01); *F28D 2021/0054* (2013.01); *F28F 2210/02* (2013.01); *G21D 1/006* (2013.01)

(56) References Cited

U.S. PATENT DOCUMENTS

2016/0201999 A1* 7/2016 Cachon ................. F28F 9/0275
  165/162
2017/0089643 A1* 3/2017 Arafat ................... F28D 9/0093

FOREIGN PATENT DOCUMENTS

| WO | 2015028923 | A1 | 3/2015 |
| WO | 2015092199 | A1 | 6/2015 |

* cited by examiner

PLATE HEAT EXCHANGER MODULE FOR WHICH THE CHANNELS INTEGRATE AS INPUT A UNIFORM FLOW DISTRIBUTION ZONE AND A FLUID BIFURCATION ZONE

TECHNICAL FIELD

The present invention concerns a heat exchanger module with a stack of metal plates and with at least two integrated fluid circuits.

The present invention relates more particularly to the production of a new type of heat exchanger module to improve the uniformity of the distribution of the various fluid internal circulation channels, whilst at the same time ensuring good thermal efficiency and satisfactory thermo-mechanical loading, without compromising the compactness of the module.

Known heat exchangers comprise at least two circuits with internal fluid circulation channels. In exchangers with only one circuit, the exchanges of heat are effected between the circuit and a surrounding fluid in which it is immersed. In exchanges with at least two fluid circuits, the exchanges of heat are effected between the two fluid circuits.

There are known chemical reactors that employ a continuous process whereby a small quantity of co-reagents is injected at the inlet of a first fluid circuit, preferably equipped with a mixer, and the chemical product obtained is simultaneously recovered at the outlet of said first circuit. Some of these known chemical reactors comprise a second fluid circuit, usually termed a utility circuit, the function of which is thermal control of the chemical reaction, either by input of the heat necessary for the reaction or to the contrary by evacuation of the heat given off thereby. Chemical reactors of this kind with two fluid circuits with utility are usually termed exchanger-reactors.

The present invention concerns as much the production of heat exchanger modules with the sole function of exchange of heat and two integrated fluid circuits as the production of exchanger-reactors. Accordingly, by "heat exchanger module with at least two fluid circuits" must be understood, in the context of the invention, as much a heat exchanger module with only the heat exchange function as an exchanger-reactor.

The principal use of an exchanger module according to the invention using two fluids is its use with a gas as one of the two fluids. This may advantageously refer to a liquid metal and a gas, for example liquid sodium and nitrogen.

The principal intended application of an exchanger module according to the invention is the exchange of heat between a liquid metal, such as liquid sodium, in the secondary loop and nitrogen as the gas in the tertiary loop of a fast neutron reactor cooled by liquid metal, such as a liquid sodium cooled fast reactor (SFR) and that is part of the family of so-called fourth generation reactors.

A heat exchanger module according to the invention may also be used in any other application necessitating an exchange between two fluids, such as a liquid and a gas, preferably when it is necessary to have a compact exchanger of high thermal power.

By "primary fluid" is meant in the context of the invention the usual meaning in the thermal field, namely the hot fluid that transfers its heat to the secondary fluid, which is the cold fluid.

A contrario, by "secondary fluid" is meant in the context of the invention, in the usual sense in the thermal field, namely the cold fluid to which heat is transferred from the primary fluid.

In the principal application, the primary fluid is the sodium that circulates in the so-called secondary loop of the thermal conversion cycle of an RNR-Na reactor, while the secondary fluid is the nitrogen that circulates in the tertiary loop of said cycle.

PRIOR ART

Known tube exchangers are for example shell and tube exchangers, in which a U-shape or helical shape bundle of straight or curved tubes is fixed to perforated plates and disposed inside a fluid-tight enclosure termed the shell. In these tube and shell exchangers, one of the fluids circulates inside the tubes while the other fluid circulates inside the shell. These tube and shell exchanges have a large volume and are therefore of small compactness.

Existing so-called plate heat exchangers have major advantages compared to existing so-called tube heat exchangers, in particular in terms of their thermal performance and their compactness thanks to a favorably high ratio of the surface area to the volume of thermal exchange. Compact plate exchangers are used in numerous industrial fields.

In this field of compact plate exchangers, numerous elementary shapes defining thermal exchange patterns have been developed.

There may first be cited exchangers with plates integrating fins, in which a thermal exchange pattern is defined by a structure delimited by fins, the structures being mounted between two metal plates and having highly varied geometries. The exchange pattern may be different between one of the two fluid circuits of the exchanger and the other one. The assembly between metal plates is usually effected by brazing or by diffusion welding.

There are also known exchangers with undulating or corrugated plates. The undulations are created by drawing a plate separating the two fluid circuits. Because of this, the exchange pattern is identical for each of the two fluid circuits. The flow of fluids generated by this type of exchange pattern is three-dimensional and therefore offers very high performance. The assembly between plates is effected either by bolted connections or by peripherally welding them (conventional welding or diffusion welding).

There are finally known plate exchangers with machined grooves, the machining being carried out mechanically or electrochemically. The channels defined by machining are of millimeter-size section and are most often continuous with a regular zigzag profile. The plates are assembled by diffusion welding enabling welding at all points of contact between two adjacent plates. This type of plate exchanger with machined grooves is therefore inherently highly resistant to pressure.

Some of the inventors of the present invention have designed an exchanger with modules using stacked plates for the exchange of heat between a gas and a liquid metal in the context of the production of a nuclear reactor of the so-called fourth generation reactor family, that is to say in a configuration of thermal exchange between an excellent heat conductor, the liquid metal, typically liquid sodium (Na), and a fluid with much lower heat transfer properties, the gas, typically nitrogen ($N_2$).

Thus the patent application WO2015/028923 A1 describes and claims a heat exchanger in which the heat exchanger modules are arranged inside and rigidly fixed to an enclosure pressurized by the pressure of the gas, typically around 180 bar, by means of a support and retaining structure, while the liquid metal distribution pipework is not fixed to that support structure.

In the above design, the fluid-tight enclosure has a gas circuit manifold role and the dimensions of the heat exchanger modules are governed primarily by the gas, as it is the less thermally conductive of the two fluids.

While the size of the exchange pattern of the gas circulation channels is strictly dictated by thermo-hydraulic performance constraints, the size of the liquid metal circulation channels must take into consideration the risks of blockage linked to the circulation of the liquid metal, which limits the minimum section of the latter's circulation channels. Taking also into account differences in physical characteristics, more particularly density characteristics, between a gas and a liquid metal, a resulting exchanger module has head losses in the liquid metal circulation channels that are very low, typically of the order of 40 mbar.

Moreover, aiming at compactness, each exchanger module has a unitary thermal power rating of the order of 12 MWth, which, given the rules regarding dimensions, implies a very large number of fluid circulation channels, typically equal to approximately 5000 per module.

Another constraint to be considered stems from the fact that each module is arranged inside an enclosure pressurized by the gas. In operation, the structures feeding and recovering the liquid metal, consisting of the manifolds and the distribution pipework, may be subjected to high temperatures and compression forces that unless particular precautions are taken could lead to damage by buckling resulting from creep. Also, from a thermomechanical point of view, these structures must be designed to be as compact as possible.

To summarize, the configuration of the heat exchanger modules inside the enclosure pressurized by the gas, according to the aforementioned application WO2015/028923 A1, implies a very large number of channels per module with great compactness.

Now, the inventors of the present invention have analyzed that this configuration may lead to a non-uniform distribution of the liquid metal in the channels in each exchanger module, which may compromise on the one hand the overall thermal efficiency of the exchanger and on the other hand the thermomechanical strength of the structures of the exchanger.

Thus the inventors were faced with the necessity to design a plate exchanger module enabling homogeneous distribution of liquid metal in the circulation channels in the module to be ensured.

Although the hydraulic conditions of an exchanger module according to the aforementioned configuration are not much encountered in the prior art, notably because of a ratio between the very high Reynolds number Re at the inlet and the relatively low one in the channels, the inventors have made an inventory of the various existing solutions enabling rendering the circulation of a fluid in an exchanger more homogeneous (uniform).

One of the known solutions consists in increasing the size of the liquid metal manifolds, in order to reduce the speed range in the latter and therefore the dynamic pressure, compared to the head loss in the channels of the module. This solution cannot be adopted because as mentioned above the structures feeding and recovering the liquid metal must be as compact as possible and therefore the manifold as small as possible.

It is also known to place a grille inside the manifold. This grille enables the liquid metal jet to be broken up before it enters the module. This solution is pertinent on the hydraulic level, because it could make it possible to solve the problem of poor distribution between plates and within the same plate with a very low cost in terms of head loss, typically with a residual dispersion value of 3% and a pressure variation less than 150 mbar.

The major disadvantage of this solution with a grille mounted inside the manifold is the addition of a thermal inertia, which is prejudicial in an operating regime with thermal transients. Moreover, because of the additional component consisting of the grille, mounted inside the manifold, the latter has a size that remains large and that therefore necessitates high wall thicknesses.

Finally, it is known to shape the channels with bifurcations in the liquid metal entry zone, which is as it were a pre-manifold. Above all else this makes it possible to reduce the number of channels to which the fluid is to be distributed at the level of the manifold. There have been shown in FIGS. 1 to 3 examples of bifurcation from a single channel 10 formed in a metal plate, which respectively lead to sixteen channels 10.1 to 10.16 or five channels 10.1 to 10.2 for the exchange zone. It is specified that the configuration of FIG. 2 differs from that of FIG. 1 in that the channels are interconnected in the central exchange part.

The efficiency of this solution increases as the channel head loss increases, typically corresponding to a residual dispersion value of 10% and a pressure variation of 500 mbar, or to a residual dispersion value of 13% and a pressure variation of 350 mbar.

Now, given the very large number of fluid circulation channels to be fed per module, a solution with a single channel per module on the inlet side cannot be adopted. In fact, to preserve acceptable head losses in a module, only a reduction by a factor of 4 in the number of channels discharging into the manifold may be suitable.

In other words, the inventors have also concluded that the use of bifurcations as in the prior art cannot be adopted in the context of the configuration explained above, because that does not enable reduction by less than 10% of a poor distribution of the liquid metal in each module.

Undoubtedly, work has been done on the optimum bifurcation geometry for the latter not to lead to poor distribution.

Thus the patent application WO2015/092199 discloses a compact catalytic reactor with fewer than three plates, the channels of the plates having at least one zone of straight channels of millimeter size, which is a heat exchange zone, and at least one fluid distribution zone on the upstream and/or downstream side of the exchange zone, with a discontinuity of the walls (ribs) that separate the channels along the distribution zone, and an increase in the width of the walls along the distribution zone.

The U.S. Pat. No. 4,665,975 discloses a heat exchanger with a stack of plates assembled by diffusion welding, the channels of each plate being configured with three zones including a manifold zone, a pre-manifold zone, and a distribution/exchange zone, the channels communicating with one another, transversely to the longitudinal axis of the plates, at the interface between the pre-manifold zone and the exchange zone, which enables pressure rebalancing.

Although the solution described in the application WO2015/092199A1 a priori improves the distribution of the fluid in the channels in the same plate in a good number of hydraulic configurations, the solution according to the U.S. Pat. No. 4,665,975 may give rise to certain problems because of an unbalanced geometry (length and bends) of the channels constituting the pre-manifold zone, which generates unwanted recirculation of fluid.

Moreover, and above all, none of the above solutions enables solution of the problem of a non-homogeneous distribution between the plates of the stack of exchangers.

There is therefore a need for further improvement of compact heat exchanger modules with stacked plates, with at least two integrated fluid circuits, in particular those intended for exchange of heat between a gas and a liquid metal, notably with the aim of rendering more homogeneous the distribution of the fluids in the modules, that is to say both in a given plate and between the plates of the stack, without compromising the compactness of the modules.

The object of the invention is to address at least part of this need.

SUMMARY OF THE INVENTION

To this end, the invention consists in a heat exchanger module with longitudinal axis (X) comprising a stack of plates defining at least two fluid circuits, at least some of the plates each comprising fluid circulation channels each delimited at least in part by a groove, the channels of at least one of the two circuits, termed the first circuit, including:

- a zone of feeding the fluid from the exterior of the stack, in which the channels are parallel to one another and extend along a secant axis (X') intersecting the longitudinal axis (X) and in which two adjacent channels communicate with one another via at least one notch formed in the rib separating their respective grooves;
- a zone termed the bifurcation zone in which each channel is divided into at least two straight channels parallel to one another and parallel to the longitudinal axis (X), being separated from one another by a rib;
- a zone termed the connection zone between the feeding zone and the bifurcation zone, the zone in which each channel has a straight profile that extends along the secant axis (X') and a curved profile continuous with the straight profile in order to connect the channel with a straight channel of the bifurcation zone;
- a zone of continuous exchange with the bifurcation zone in which the parallel straight channels separated from one another by the ribs extend parallel to the longitudinal axis (X).

In the module according to the invention, the channels of each plate of the first circuit communicate with those of the other plates of the first circuit in their respective feed zone, via openings passing through the stack but not communicating with the channels of the second circuit.

In other words, the invention essentially consists in judiciously combining communication of the channels with one another in the same plate and between all the plates of the same circuit, in a feed or pre-manifold zone, with a succession of two-by-two groupings of channels in the form of bifurcations.

The communication between channels takes the role of a jet-break grille that is integrated into each plate and between the plates, which makes possible natural rebalancing of the flows between all the channels of the same fluid and therefore guarantees homogeneous distribution.

The succession of groups of channels enables reduction of the number of channels to be fed by the manifold on the outside of the stack and thereby to increase the head loss induced and also to reduce the size of the manifold.

Thanks to the invention, it is therefore possible to distribute homogeneously all the circulation channels of a fluid circuit in a module, even in a critical hydraulic situation in which the manifold has small dimensions, the feed rate is high, and the head loss of the channels is low.

The principal advantages of the invention are being able to address the problem of a poor distribution of one of the fluids in an exchanger module without adding any non-integrated device by modification of the head loss (bifurcation zone) and with an integrated grille enabling communication between channels of the same plate and between plates, enabling the module to remain very compact and reducing the size of the inlet manifold.

The invention also enables reduction of the number of channels to be fed, which enables reduction of the size of the manifold, and improvement of the thermomechanical dimensions.

The inventors have carried out preliminary computational fluid dynamics (CFD) calculations. Those calculations show that the invention enables improvement of the homogeneity of distribution of liquid sodium in a heat exchanger module, under real world conditions of use in the context of an Na/gas exchanger of a fourth generation nuclear reactor.

According to a variant embodiment, the curved profile of each channel of the first circuit comprises two curves to connect the straight profile of the connection zone to the straight channel of the bifurcation zone.

According to an advantageous embodiment, each straight channel is divided into four channels in the bifurcation zone.

According to another advantageous embodiment, the angle between the secant axis (X') and the longitudinal axis (X) of the module is between 0 and 45° inclusive.

An advantageous alternative for the production of the module may consist in inserting a plate of the first circuit between two plates of the second circuit at least in the central part of the stack.

The channels of the first circuit may have an oval, circular, rectangular or square section.

The metal constituting the plates of the exchanger module according to the invention is chosen as a function of the conditions of its intended use, namely the pressure of the fluids, the temperatures and the natures of the fluids circulating through the module.

It may for example be a question of aluminum, copper, nickel, titanium or alloys of those elements as well as a steel, notably an alloy steel or stainless steel, or a refractory metal chosen from alloys of niobium, molybdenum, tantalum or tungsten.

The invention also consists in a method of producing a heat exchanger module described hereinabove, comprising the following steps:

- machining grooves in first metal plates in order to constitute the channels of the first circuit configured with the feed, connection, bifurcation and exchange zones;
- machining grooves in second metal plates in order to constitute the channels of the second circuit;
- alternately stacking the first plates and the second plates so as to have the through-openings that enable communication between channels of the plates of the first circuit but not with those of the plates of the second circuit, assembling the first and second metal plates to one another, either by hot isostatic compression (HIC), or by a process termed a hot uniaxial diffusion welding process, so as to obtain diffusion welding between them, or by brazing.

The invention also concerns a heat exchanger comprising a fluid-tight enclosure intended to be pressurized by a fluid circulating in the second circuit and a plurality of heat exchanger modules as described above each extending parallel to the central axis of the enclosure and each arranged inside the enclosure.

The invention also consists in use of the heat exchanger as described above, the fluid of the first circuit, by way of primary fluid being a liquid metal and the fluid of the second circuit, by way of a secondary fluid, being a gas or a gas mixture.

The fluid in the second circuit may principally comprise nitrogen and the first fluid of the first is liquid sodium. The fluid in the first or second circuit may come from a nuclear reactor.

The invention finally consists in a nuclear installation comprising a fast neutral nuclear reactor cooled with liquid metal, notably liquid sodium cooled fast reactor (SFR) and a heat exchanger comprising a plurality of exchanger modules as described above.

DETAILED DESCRIPTION

Other advantages and features of the invention will emerge more clearly on reading the detailed description of embodiments of the invention given by way of nonlimiting illustration with reference to the following figures, in which.

For clarity, the same elements in accordance with the prior art and in accordance with the invention are designated by the same reference numbers.

In the whole application, the terms "inlet", "outlet", "upstream", "downstream" are to be understood in relation to the direction of circulation of the fluid concerned in a heat exchange module according to the invention.

Figures 1, 2:
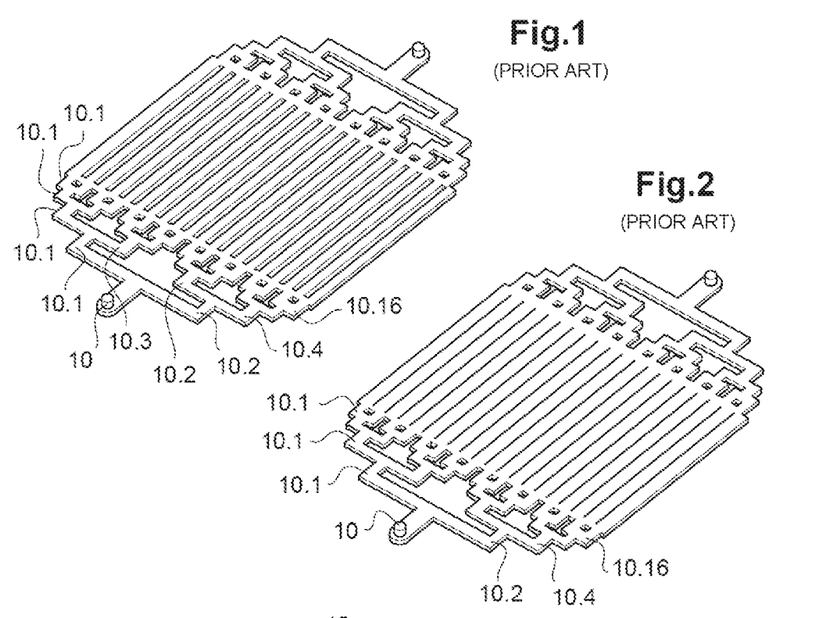
FIG. 1 is a diagrammatic perspective view of a plate heat exchanger module plate according to one example of the prior art, with a single channel at the inlet and at the outlet and bifurcations ahead of the exchange zone.
FIG. 2 is a diagrammatic perspective view of a plate heat exchanger module plate according to another example of the prior art with only one channel at the inlet and at the outlet and bifurcations ahead of the exchange zone.
Figure 3:
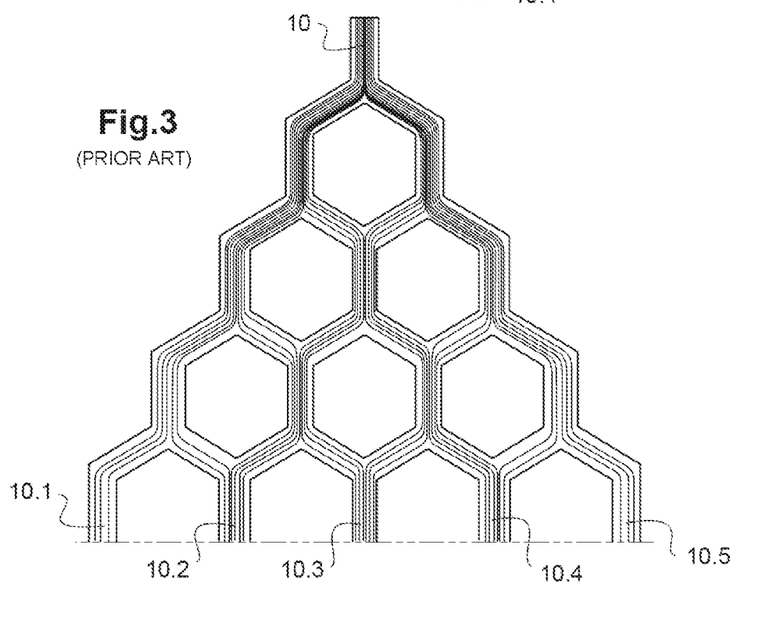
FIG. 3 is a diagrammatic perspective view of a plate heat exchanger module plate according to a further example of the prior art with a single channel at the inlet and at the outlet and bifurcations ahead of the exchange zone.

FIGS. 1 to 3 relating to the prior art have already been commented on in the preamble. They are therefore not described hereinafter.

There has been shown in FIGS. 4 to 7 a plate 1 of one of the two fluid circuits, termed the first circuit, of a heat exchanger module according to the invention, which extends along a longitudinal axis X. This first circuit is preferably intended to circulate a liquid metal, such as liquid sodium.

This plate 1 is grooved with channels 10, 11, 12, 13 with zones Z1, Z2, Z3, Z4 produced and shaped differently.

In the feed zone Z1 for feeding fluid from outside the stack, the channels 10 are parallel to one another and extend along a secant axis X' intersecting the longitudinal axis X and two adjacent channels 10 communicate with one another via at least one notch 16 formed in the rib 15 separating their respective grooves.

Figure 6:
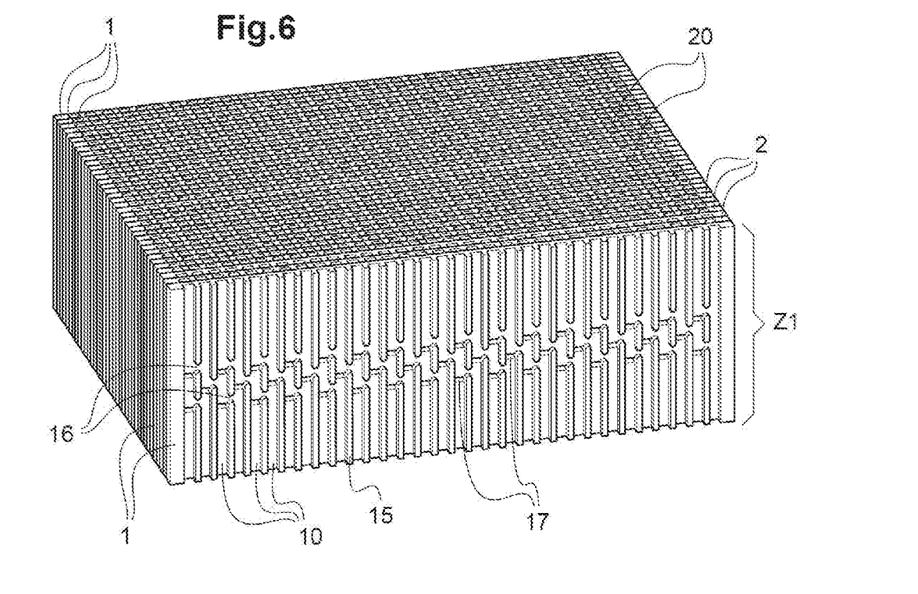
FIG. 6 is a detail view in perspective showing the stack of plates of a module according to the invention, at the level of the feed zone with a grille in accordance with a first variant.

As can be seen in FIG. 6, through-openings 17 are made in each channel 10 to enable communication between all the plates 1 of the first circuit through the stack. To this end, other through-openings not shown are also made through the plates 2 of the second circuit. These other through-openings do not enable communication between the channels of the first circuit and those of the second circuit.

Accordingly, the channels 10 with the notches 16 between channels and the openings 17 through the plates 1 form a communication grille between channels of the same plate 1 and between the plates 1.

Figure 4:
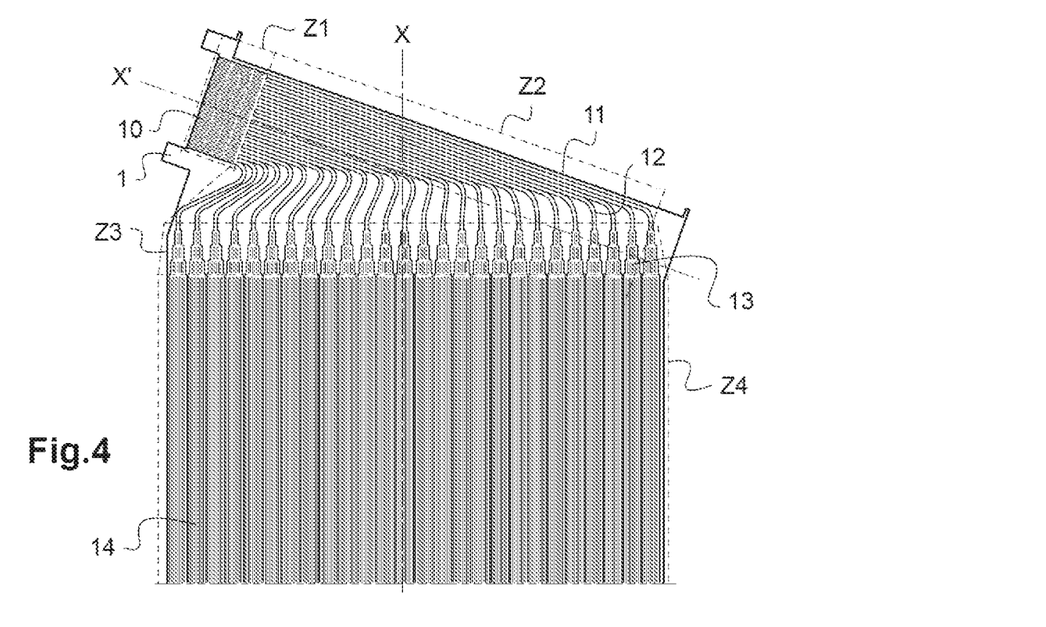
FIG. 4 is a top view of a plate heat exchanger module plate according to a first variant of the invention with a feed zone with a plurality of inlet channels forming a feed grille and a zone with bifurcations ahead of the exchange zone.
Figure 5:
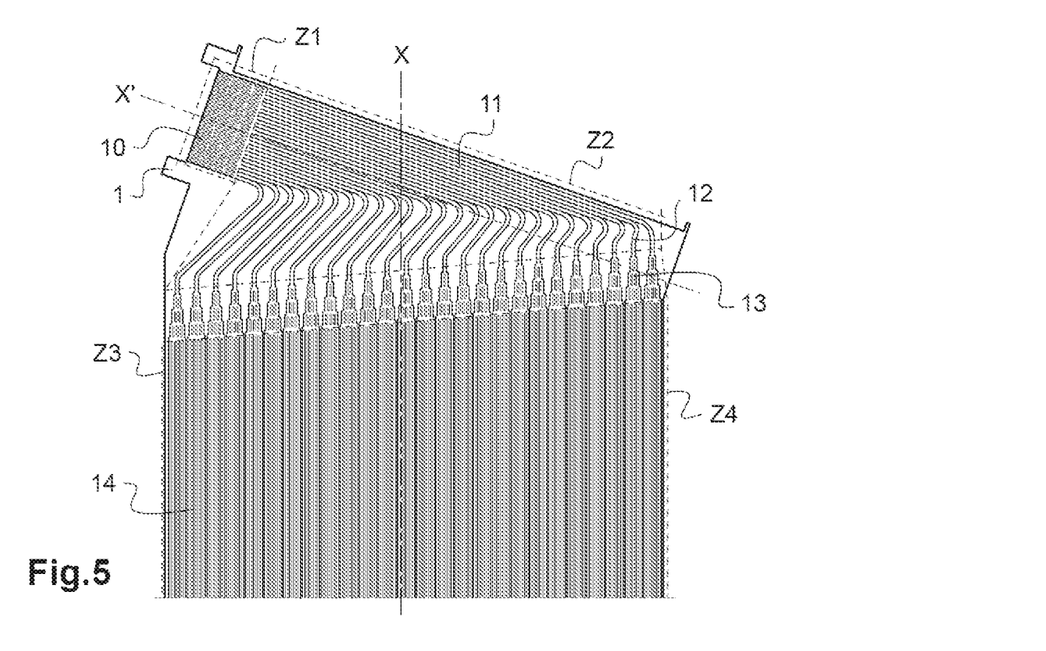
FIG. 5 is a plan view of a plate heat exchanger module plate according to a second variant of the invention with a feed zone with a plurality of inlet channels forming a grille and a zone with bifurcations ahead of the exchange zone.

In continuity with the feed zone Z1, the channels are extended in a connection zone Z2. In this zone Z2, each channel has a straight profile 11 that extends along the secant axis X' and a curved profile 12 continuous with the straight profile to connect the channel 11 with a straight channel of a bifurcation zone Z3 in continuity with and downstream of the connection zone Z2.

FIG. 5 is a variant of FIG. 4 in which the curved profiles are shorter in order to have all of the channels 13 in the bifurcation zone aligned transversely with the longitudinal axis X.

As can be seen in FIGS. 4 and 5, the connection zone Z2 has a relatively large area, which enables sufficient physical separation between the feed zone Z1 and the downstream bifurcation zone Z3. This physical separation enables sufficient space to be provided in the plates 2 of the second circuit so that there is no communication between the channels of the first circuit with those of the second circuit.

In the bifurcation zone Z3, each channel 13 is divided into four channels 13.1, 13.2, 13.3, 13.4 that are straight, parallel to one another and extend parallel to the longitudinal axis X, being separated from one another by a rib.

Finally, in continuity with the bifurcation zone Z3, the thermal exchange zone Z4 integrates the straight, parallel channels 13.1, 13.2, 13.3, 13.4 separated from one another by the ribs extending parallel to the longitudinal axis X.

Figure 7:
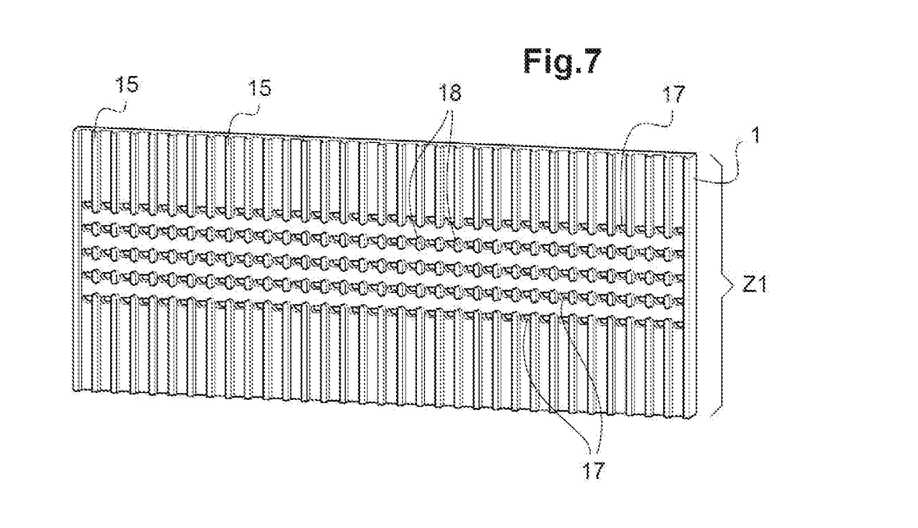
FIG. 7 is a detail view in perspective showing the stack of plates of a module according to the invention, at the level of the feed zone with a grille in accordance with a second variant.

There has been represented in FIG. 7 a variant embodiment of the feed zone Z1 in which the rib portions 18 that separate the openings 16 between channels 10 are all identical and aligned, likewise the through-openings 17.

Figures 8, 9:
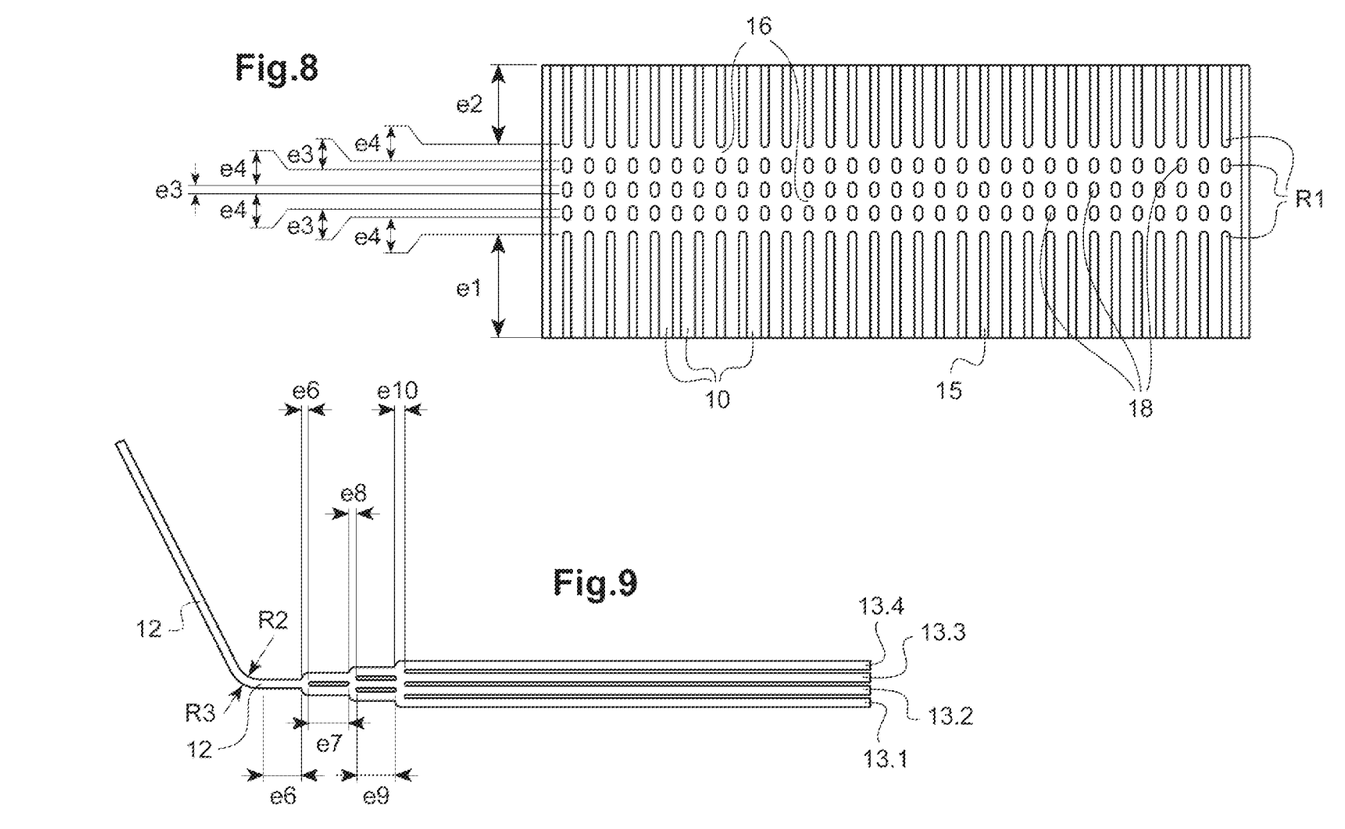
FIG. 8 is a detail view conforming to the second variant from FIG. 7, FIG. 8 showing an example of dimensions.
FIG. 9 is a detail view of a part of a bifurcation zone according to the invention, FIG. 9 showing an example of dimensions.

There has been represented in FIG. 8 an example of the dimensions of the plate 1 in the feed zone Z1 in the variant from FIG. 7.

For example, the numerical values are as follows: R1=1.5 mm, e1=42.5 mm, e2=32.5 mm, e3=3 mm, e4=7 mm.

In an analogous manner, FIG. 9 shows an example of the dimensions of a channel 13 with four bifurcations 13.1 to 13.4 based on the curved profile 12 of the connection zone Z2.

For example, the numerical values are as follows: R2=20 mm, R3=26 mm, e5=25 mm, e6=5.2 mm, e7=25 mm, e8=5.2 mm, e9=25 mm and e10=6 mm.

The following procedure is used to produce an exchanger module according to the invention.

There are respectively machined in identical metal plates 1 of rectangular shape grooves with the feed zone Z1, connection zone Z2, bifurcation zone Z3 and exchange zone Z4 as described in detail above. The plates 1 are then machined in the zones Z1 so as to have the notches 16 between the channels 10 and the openings 17 through each plate 1.

Grooves 20 defining the channels of the second circuit are machined in metal plates 2 of identical shape and size to the plates 1.

An alternating stack is produced of the plates 1 of the first circuit with the plates 2 of the second circuit so as to have the through-openings 17 that enable communication between channels of the plates 1 of the first circuit but not with those of the plates of the second circuit.

The metal plates 1, 2 are then assembled together, either by hot isostatic compression (HIC), or by a hot uniaxial diffusion welding process so as to obtain diffusion welding between them.

Comparative CFD calculations have been carried out by the inventors, in order to verify the best fluid distribution performance in the first circuit of the module according to the invention.

The calculations have been done with the hypothesis of circulation of liquid sodium at a temperature of 545° C. at the inlet of the first circuit.

It is specified here that a channel in accordance with the comparative examples 1 and 2 has the same dimensions, i.e. length, width and height, as a channel in accordance with example 3 in accordance with the invention.

All the comparative calculations are summarized in the table below.

Comparative example 1 relates to a prior art module in which the channels of the zone Z4 of the Na circuit are straight and all discharge into the manifold.

Comparative example 2 relates to a module comprising channels in the plates 1 only between the fluid inlet and the exchange zone Z4, a zone Z3 with the bifurcations as shown in FIGS. 4 and 5 and sized like those of the invention in FIG. 9.

Example 3 conforms to the invention, with a module comprising channels in the plates 1 with all the zones Z1 to Z4, the zone Z1 being sized as in FIG. 8 and the zone Z3 with the bifurcations sized like those of the invention in FIG. 9.

In all the examples the other shapes and dimensions of the plates 1 and 2 are identical.

There has further been indicated in the table an ideal case of exchange between liquid sodium that leaves the exchanger at 345° C. and nitrogen that enters at 310° C.

In this table, it is seen that thanks to the invention the dispersion of the flows per channel is much lower, the head losses much higher but acceptable, with a thermal efficiency equal to the ideal case.

Moreover compared to example 2, it is seen that the zones Z1 with notches 16 and the through-openings between plates 1 enable a reduction of the dispersion of the flows by a factor of 4.

It may therefore be concluded from this that the system enables improvement of the distribution of liquid sodium.

Other variants and improvements may be provided without this departing from the scope of the invention.

For example, in an exchanger module using a liquid metal, such as liquid sodium, and a gas, such as nitrogen, it is therefore possible and advantageous to envisage the gas circuit with straight channels and a liquid metal circuit with channels having the various zones Z1, Z2, Z3, Z4, and preferably of larger sections than those of the gas circuit channels.

It goes without saying that a liquid metal/gas exchanger is one application example, and that it is entirely possible to envisage having the same zones Z1 to Z4 according to the invention for both the fluid circuits in the same exchanger.

The second circuit being for preference more dedicated to the circulation of gas, not too much head loss must be introduced, and it is therefore preferable not to provide the bifurcation zone for the plates of this second circuit. On the other hand, it is advantageous to integrate a jet-breaker grille in each plate of the second circuit, in order to perfect the distribution.

It goes without saying that the number of stages, that is to say of plates for the first circuit and/or for the second circuit, is to be adapted according to the operating conditions and that it is entirely feasible to envisage a number different from that in the embodiments shown.

The invention claimed is:

1. A heat exchanger module with longitudinal axis (X) comprising a stack of plates defining at least two fluid circuits, at least some the plates each comprising fluid circulation channels each delimited at least in part by a groove, the channels of at least one of the two circuits, termed the first circuit, including:
a zone (Z1), termed the feeding zone, of feeding the fluid from the exterior of the stack, in which the channels are parallel to one another and extend along a secant axis (X') intersecting the longitudinal axis (X) and in which two adjacent channels communicate with one another via at least one notch formed in a rib separating their respective grooves;

TABLE

| | Total head losses ΔP | Flow dispersion per channel | Liquid sodium temperature at outlet of module (° C.) | | | Thermal efficiency |
| --- | --- | --- | --- | --- | --- | --- |
| | (Pa) | (%) | minimum | mean | maximum | (ε) |
| Ideal case | | 0 | 345 | 345 | 345 | 0.93 |
| Example 1 | 6000 | 25 | 315 | 349 | 438 | 0.91 |
| Example 2 | 50000 | 8 | 330 | 343 | 384 | 0.92 |
| Example 3 (according to the invention) | 60000 | <2 | −345 | 345 | −345 | 0.93 | a zone (Z3) termed the bifurcation zone in which each channel is divided into at least two straight channels parallel to one another and parallel to the longitudinal axis (X), being separated from one another by a rib;

a zone (Z2) termed the connection zone between the feeding zone and the bifurcation zone, in which each channel has a straight profile that extends along the secant axis (X') and a curved profile continuous with the straight profile in order to connect the channel with a straight channel of the bifurcation zone;

a zone (Z4) of continuous exchange with the bifurcation zone in which the parallel straight channels separated from one another by ribs extend parallel to the longitudinal axis (X);

wherein the channels of each plate of the first circuit communicate with those of the other plates of the first circuit in their respective feed zone (Z1), via openings, made in each channel of the feeding zone, passing through the stack but not communicating with the channels of the second circuit, the notches and the openings forming a jet-break grille for rebalancing the flows of the fluid between the channels of the first circuit when said fluid is circulating in said channels.

2. The heat exchanger module as claimed in claim 1, wherein the curved profile of each channel of the first circuit comprises two curves to connect the straight profile of the connection zone to the straight channel of the bifurcation zone.

3. The heat exchanger module as claimed in claim 1, wherein each straight channel is divided into four channels in the bifurcation zone (Z3).

4. The heat exchanger module as claimed in claim 1, wherein the angle between the secant axis (X') and the longitudinal axis (X) of the module is between 0 and 45° inclusive.

5. The exchanger module as claimed in claim 1, wherein a plate of the first circuit is inserted between two plates of the other of the two circuits, termed the second circuit, at least in the central part of the stack.

6. The exchanger module as claimed in claim 1, wherein the channels of the first circuit have an oval, circular, rectangular or square section.

7. A method of producing a heat exchanger module as claimed in claim 1, comprising the following steps:
   machining grooves in first metal plates in order to constitute the channels of the first circuit configured with the feed, connection, bifurcation and exchange zones;
   machining grooves in second metal plates in order to constitute the channels of other of the two circuits, termed the second circuit;
   stacking in an alternating manner the first plates and the second plates so as to have the through-openings that enable communication between channels of the plates of the first circuit but not with those of the plates of the second circuit;
   assembling the first and second metal plates to one another, either by hot isostatic compression (HIC), or by a process termed a hot uniaxial diffusion welding process, so as to obtain welding by diffusion between them, or by brazing.

8. The use of a heat exchanger comprising a plurality of heat exchanger modules as claimed in claim 1, wherein the fluid of the first circuit, by way of primary fluid is a liquid metal and the fluid of a second circuit, by way of a secondary fluid, being a gas or a gas mixture.

9. The use as claimed in claim 8, wherein the fluid of the second circuit comprises mainly nitrogen and the fluid of the first circuit being liquid sodium.

10. The use as claimed in claim 8, wherein the fluid of the first or second circuit comes from a nuclear reactor.

11. A nuclear installation comprising a fast neutral nuclear reactor cooled with liquid metal, notably a liquid sodium cooled fast reactor (SFR) and a heat exchanger comprising a plurality of exchanger modules as claimed in claim 1.

* * * * *